United States Patent Office 3,063,950
Patented Nov. 13, 1962

3,063,950
POLYMERIC AMIDOXIMES AND THEIR DERIVATIVES AND A METHOD OF PREPARING SAME
Ferdinand Leonard Schouteden, Wilrijk-Antwerp, Belgium, assignor to Gevaert Photo-Producten, Mortsel-Antwerp, Belgium, a Belgian company
No Drawing. Filed Feb. 26, 1962, Ser. No. 175,790
5 Claims. (Cl. 260—2.1)

The present invention relates to new compositions of matter viz. to macromolecular substances containing amidoxime groups and derivatives thereof.

The application is a continuation-in-part of our copending application Serial No. 535,295, filed September 19, 1955, now abandoned.

According to the invention, macromolecular substances containing amidoxime groups are produced by reacting macromolecular substances containing nitrile groups with free hydroxylamine, until at least part of the nitrile groups have been converted into amidoxime groups, said macromolecular substances being dissolved, dispersed or swelled by an organic liquid.

The scheme of the basic reaction for the preparation of macromolecular substances containing amidoxime groups according to my invention may be represented by the following general formula:

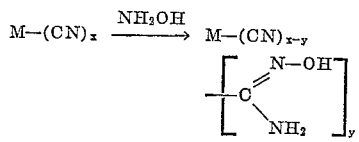

wherein M is the macromolecular part of the molecule, i.e., the macromolecular skeleton which can include additional functional groups in addition to nitrile groups; $x$ is the number of nitrile groups in the polymeric starting material; and $y$ is the number of amidoxime groups in the final reaction product.

The reaction is carried out with the macromolecular substance containing nitrile groups being dissolved, dispersed or swollen in a non-aqueous organic liquid such as dimethylformamide, dimethylsulfoxide and lower alkanols such as butanol.

Although the reaction can be carried out at room temperature, it is advantageous to heat the mixture between 50 and 100° C. to increase the reaction speed.

The reaction is continued until all the nitrile groups have reacted with free hydroxylamine or it can be interrupted after an arbitrarily chosen period of time. The reaction may be performed either in one operation or stepwise.

The hydroxylamine can be used in the form of its various known salts in which case the hydroxylamine is liberated by the addition of neutralizing substances, i.e., suitable alkaline substances.

When hydroxylamine is added to the reaction medium in the form of its salts the necessary quantity of neutralizing substances for liberating hydroxylamine may be added stepwise or at once to the reaction medium, whereby the hydroxylamine is gradually or substantially immediately liberated. The hydroxylamine may be liberated and filtrated in advance and this filtrated hydroxylamine used for the amidoxime reaction.

In carrying out the process of the present invention, any macromolecular substance containing nitrile groups may be used as the starting material; for instance cyano-containing polycondensates, or polymers, copolymers, block copolymers and graft copolymers from polymerisable nitriles and all combinations thereof, optionally crosslinked, or natural or synthetic macromolecular substances cyano-ethylated with acrylonitrile and/or grafted with a polymerisable nitrile, or polymers containing carboxyl or anhydride groups esterified with nitrile groups containing hydroxy compounds. Monomers convenient for the preparation of some of these polymers are for example acrylonitrile, methacrylonitrile and vinylidene cyanide alone or in combination with other polymerisable materials. Macromolecular substances which may be cyanoethylated and/or grafted are for example, polyvinyl alcohol, polyvinylamine, polyacryl- or methacrylamide, cellulose, alginic acid, starch, zein, gelatin, casein as well as their derivatives.

In practical applications, one of the most simple procedures consists in using the reaction mixture directly after reaction of the macromolecular substances containing nitrile groups with hydroxylamine. After filtration this reaction mixture is ready for further use. However, when preferred, the converted macromolecular substance may first be precipitated in a non-solvent and redissolved in proper solvents. The conversion of nitrile groups into amidoxime groups by the process of the invention has an influence on the solubility characteristics of the macromolecular substance involved. For instance when polyacrylonitrile of an intrinsic viscosity of 0.5 is reacted between 65° C. and 75° C. with hydroxylamine in dimethylformamide, the solubility in dimethylformamide (DMF), in acid medium (HCl N), or in alkaline medium (NaOH N) of the polymer obtained, depends on the percentage of —CN— groups which have been converted into amidoxime groups.

| Solvent | Solubility characteristics in relation to the percentage of converted —CN— groups | | |
|---|---|---|---|
| | Soluble | Swells between, percent | Insoluble |
| DMF | <40% conversion of —CN— groups. | 40–50 | >50% conversion of —CN groups. |
| Acid | >90% conversion of —CN— groups. | 90–70 | <70% conversion of —CN groups. |
| Alkaline | >80% conversion of —CN— groups | 80–60 | <60% conversion of —CN groups. |

When copolymers containing nitrile groups are converted with hydroxylamine, the solubility characteristics of the copolymers are also influenced, but the solubility depends not only on the ratio of nitrile groups which are converted into amidoxime groups but also on the ratio between other monomeric units and monomeric acrylonitrile units present in the original copolymer.

The basic reaction may be preceded, accompanied or followed by other reactions with respect to one or more other functional groups present in the macromolecular substance.

Typical reactions which may precede or follow the amidoxime formation are, for example, complete or partial saponification or esterification of some functional groups, addition of alkylene oxides and/or acrylonitrile, acetal formation by reaction between polymers of the polyvinyl alcohol type and aldehydes, and esterification of carboxyl or anhydride groups with nitrile groups containing hydroxy compounds.

Typical examples of reactions accompanying the amidoxime-formation are, for example, inter- and/or intramolecular ring-formation, neutralization of acid groups and the splitting out of hydrogen chloride in chlorine containing copolymers. When the macromolecular part contains $$-\underset{\underset{O}{\|}}{C}-X$$

groups wherein X=$NH_2$, NHR, NRR′, halogen or the complement to form anhydride groups, the hydroxylamine may simultaneously react with these groups with the formation of hydroxamic acid. Obviously, the sequence and the degree of these reactions may be chosen arbitrarily.

Macromolecular substances containing amidoxime groups and their immediate derivatives possess very interesting properties and lend themselves to a wide variety of syntheses.

Varying the nature of starting materials, molecular weight, degree of substitution and consecutive reactions, offers the possibility of a considerable number of combinations. Owing to the presence in the macromolecular substance containing admidoxime groups of OH- and $NH_2$-groups, the new products are reactive with substances containing alkaline groups as well as acid groups. As non-limiting examples are mentioned the hydrolysis in acid and alkaline medium, the reaction with nitrous acid, with aniline or with acylating agents; the addition reaction with carbon disulfide; the formation of heterocyclic rings with acetic acid or with ethyl acetylacetate; the addition reaction of alkylene oxides and/or of acrylonitrile.

Solutions of the modified macromolecular substance obtained may be cast or subjected to spinning operations and after evaporation of the solvent, form films and fibers. I have also noted compatibility of these solutions with other polymer solutions, i.e., with aqueous solutions of gelatin, polyvinyl alcohol and polyvinyl pyrrolidone. Thus, solutions of macromolecular substances containing amidoxime groups may be used to alter the properties of the above mentioned polymer solutions.

The macromolecular substances according to the process of my present invention and/or their derivatives have very useful film- and fiber-forming properties. They may be used for the manufacture of photographic film base, outer and inner layers in graphic- or photographic elements, as a raw material in the production of wrapping material and as a coating on supports of any kind, for instance in a paint, varnish, lacquer, adhesives or coating on film, foils, sheets, fibers and other shaped aritcles.

These macromolecular substances containing amidoxime groups and derivatives thereof can further be used in the preparation of paper, either as a modifying agent for the paper-pulp or as an impregnating agent of the paper band formed. Especially valuable layers are those formed by chemical reaction of hydroxylamine with shaped articles made of polymeric materials containing nitrile groups. Used in combination with other film-forming polymers, they are capable of altering the properties of the film made from these polymers.

In the textile field, they may be used equally well as raw material for the manufacture of new synthetic fibers, or to improve the properties of other known fibers. An application of outstanding interest consists in their use to improve the properties, especially the dyeability, of fibers containing nitrile groups.

Added to other colloidal solutions, they have a marked influence on the rheological properties of these solutions. This is of special interest in the manufacture of photographic elements where it is often desirable to alter the viscosity and the gelling point of the emulsions. Furthermore, they may be used as dispersing and/or binding agents in light-sensitive emulsions. Their ability to bind or to fix different chemical substances makes them very useful particularly in elements where diffusion of chemical substances, dyes and color components has a disadvantageous effect on the quality of the product. Another application consists in their use as smoke filters in cigarettes. Under certain conditions, this fixing of other chemicals is reversible, thus, they may be used as ion-exchange resins preferably in the form of granules or fabrics.

The following examples illustrate my invention.

EXAMPLE 1

A. *Preparation of Polyacrylonitrile Solution in Dimethylformamide Medium*

50 grams of freshly distilled acrylonitrile are mixed with 500 cm.³ of thiophene free benzene and 0.200 gram of benzoylperoxide. 150 cm.³ of this solution are introduced into a round bottom flask and heated on the waterbath, so that the mixture constantly boils. Introduction of a supply of oxygen-free and dry nitrogen protects the reaction mixture from inhibition by oxygen. After 20 to 30 minutes, polymerization sets in and the remaining solution is added dropwise over a period of two hours. Heating is continued for an additional four hours in order to complete the polymerization. The polyacrylonitrile formed is suction filtered, repeatedly washed with petroleum ether and dried. A 10% solution in dimethylformamide of the resultant polyacrylonitrile which had an intrinsic viscosity $[n]$ of 0.5 was obtained.

B. *Preparation of Hydroxylamine-Solution*

235 grams of anhydrous sodium carbonate are added in small portions, with stirring to a solution of 250 grams of hydroxylamine hydrochloride in 500 cm.³ of dimethylformamide. The solution is heated to 80° C. and the mixture reacted for 30 minutes while stirring. Next, the solid substance is sucked off and kept and the clear filtrate maintained overnight at 0–5° C. whereafter the mixture is filtered for a second separation of precipitated salts (sodium chloride). The content of hydroxylamine is determined by potentiometric titration.

C. *Prepartion of Polyacrylomidoximes in Dimethylformamide Medium*

To 500 cm.³ of a 10% polyacrylonitrile solution in dimthylforamide obtained according to the procedure described in A are added 500 cm.³ of a 7.75% solution of hydroxylamine in dimethylforamide obtained according to (B). While stirring, the mixture is caused to react for 75 minutes at 55–60° C. The liquid, together with the precipitated product, is poured out in methanol while thoroughly stirring. The precipitate is thoroughly washed in methanol and dried in vacuum over concentrated sulphurpic acid. Yield: 77 grams or 95% of the theoretical amount of a very light yellow colored product, soluble in alkali and acid and insoluble in dimethylformamide.

EXAMPLE 2

A. *Preparation of Polyacrylonitrile Solution in Dimethylsulfoxide*

From the polyacrylonitrile obtained in Example 1A and having an intrinsic viscosity of 0.5, a 10% solution in dimethylsulfoxide is made.

B. *Preparation of Hydroxylamine Solution in Dimethylsulfoxide*

In the same manner as described in Example 1A, a solution in dimethylsulfoxide is made by replacing the 500 cm.³ of dimethylformamide by 500 cm.³ of dimethylsulfoxide.

C. *Preparation of Polyacrylamidoxime in Dimethylsulfoxide Medium*

100 cm.³ of a 7.4% hydroxylamine solution in dimethylsulfoxide obtained according to the method described in Example 2A are added, while stirring, to a solution of 10 grams of polyacrylonitrile having an extrinsic viscosity of 0.5 obtained according to Example 1A in 100 cm.³ of dimethylsulfoxide. The reaction mixture is heated at 70° C. After 90 minutes heating, the solution is poured into methanol, the precipitate is separated and thoroughly rinsed with methanol, and dried in vacuum over concentrated sulphuric acid. Yield: 12.6 grams of a white product which is soluble in acid, alkali and dimethylsulfoxide.

EXAMPLE 3

A. Emulsion Polymerization of Acrylonitrile

A solution containing one liter of water, one gram of potassium persulphate, one gram of potassium metabisulphite and 100 grams of sodium sulphate, is heated in a round bottom flask at 65–70° C. To this solution are added 50 cm.$^3$ of acrylonitrile while stirring. When polymerization has set in, another 150 cm.$^3$ of acrylonitrile are added within one hour. Heating is continued for another three hours. The polymer dispersion obtained is suction-filtered, repeatedly washed with warm water and dried. The extrinsic viscosity is 2.9.

B. Preparation of Polyacrylamidoxime From Emulsion Polymer

One gram of the polymer obtained according to the method described in Example 3A is dissolved in 20 cm.$^3$ of dimethylformamide. To this solution are added 1.05 grams of hydroxylamine hydrochloride and 0.250 gram of anhydrous sodium carbonate. The mixture is heated at 95° C. and after 15 and 30 minutes respectively, other similar sodium carbonate portions are added and heating is continued for half an hour. The total reaction time is one hour. The reaction mixture is then suction-filtered, precipitated in methanol, washed with fresh methanol, isolated and dried. The polymer is insoluble but swells in dimethylformamide, sodium hydroxide and hydrogen chloride solutions.

EXAMPLE 4

15 grams of polyacrylonitrile prepared by emulsion polymerization according to the method described in Example 3A and having an extrinsic viscosity of 2.9 are dissolved in 300 cm.$^3$ of dimethylformamide.

To individual 50 cm.$^3$ of this stock solution are added various amounts of hydroxylaminehydrochloride (Table I, col. 2), and the corresponding quantity of sodium carbonate (col. 3). The mixtures are uniformly heated for three hours at 75° C. After this, the reaction mixtures are suction-filtered, precipitated in methanol, washed with fresh methanol and dried.

Table I.—Properties of reaction products from 2.5 grams polyacrylonitrile with different amounts of hydroxylamine

| Expt. | NH$_2$OH.HCl, g. | Na$_2$CO$_3$, g. | Solubility in— | | |
|---|---|---|---|---|---|
| | | | DMF | HCl, N/10 | NaOH, N/10 |
| a | 0 | 0 | + | − | − |
| b | 0.65 | 0.5 | S | − | − |
| c | 1.31 | 1.0 | S | S | − |
| d | 1.97 | 1.5 | S | S | − |
| e | 2.65 | 2.0 | S | S | + |
| f | 3.28 | 2.5 | S | + | + |

NOTE.—DMF equals dimethylformamide; + equals soluble; − equals insoluble; S equals swells.

EXAMPLE 5

Two portions, each containing 1 gram of polyacrylonitrile having an extrinsic viscosity of 0.5 obtained according to the method described in Example 1A are suspended in different quantities of butanol, in amounts given by Table II. To each portion 2.1 grams of hydroxylaminehydrochloride and 1.5 grams of potassium hydroxide powder are added while stirring. The mixtures are heated for three hours at 90° C., the stirring being continued. The solid substances obtained are sucked off, washed with water, subsequently washed with methanol and dried under vacuum.

Table II.—Properties of reaction products of polyacrylonitrile and hydroxylamine suspended in different portions of butanol

| Expt. | Butanol, cm.$^3$ | Yield polyacrylamidoxime, g. | Solubility | |
|---|---|---|---|---|
| | | | HCl, N/10 | NaOH, N/10 |
| A | 100 | 1.3 | − | − |
| B | 20 | 1.5 | + | + |

NOTE.— − equals insoluble; + equals soluble.

EXAMPLE 6

A. Preparation of Copolymer Acrylonitrile/Methylene-Bis-Acrylamide

A solution is made of 20 cm.$^3$ acrylonitrile, 0.1 gram methylene-bis-acrylamide and 0.02 gram benzoylperoxide in 100 cm.$^3$ thiophene free benzene. The solution is heated for five hours on a boiling water-bath, while maintaining the solution under an inert nitrogen atmosphere. The precipitate formed is washed with petroleum ether and dried.

B. Preparation of Amidoxime

Five grams of the above prepared copolymer are swollen in 150 cm.$^3$ of dimethylformamide, and 10.5 grams of hydroxylamine hydrochloride and 7.5 grams of anhydrous sodium carbonate are added to the solution which is then heated for three hours at 80° C. The final reaction mixture is poured into water and the insoluble polymer washed with warm water and methanol. The polymer acts as an ion exchanger; it absorbs ferric ions which may be reversibly exchanged by treatment with concentrated hydrogen chloride.

EXAMPLE 7

A. Preparation of Copolymer Acrylonitrile/Vinylacetate 900 cm.$^3$ of vinylacetate, 100 cm.$^3$ of acrylonitrile and one gram of benzoyl peroxide are heated on the water-bath for 2½ hours. On the bottom of the round bottom flask, a swollen polymer precipitates. After decantation of the supernatant liquid, the solid polymer is washed with methanol, twice dissolved in dimethylformamide and precipitated in methanol and finally dried.

B. Preparation of Amidoxime 10 grams of the copolymer according to 7A are dissolved in 100 cm.$^3$ of dimethylformamide. To this solution are added 21 grams of hydroxylamine hydrochloride and 15 grams of anhydrous sodium carbonate. The solution is heated for four hours at 75° C.; the sodium chloride formed is suction-filtered and the filtrate precipitated with methanol. Further purification by dissolution in dimethylformamide and precipitation in methanol yield a product which is soluble in sodium hydroxide and 0.1 normal hydrogen chloride.

EXAMPLE 8

Three grams of Dynel fibers (Dynel is a registered trademark for a copolymer containing 60 mol percent of vinylchloride and 40 mol percent of acrylonitrile manufactured by Carbide and Carbon Chemical Corporation) are dissolved in 50 cm.$^3$ of dimethylformamide. 6.3 grams of hydroxylamine hydrochloride and 4.5 grams of anhydrous sodium carbonate are added thereto, and the mixture is heated for two hours at 80° C. After this time, the reaction mixture is suction-filtered and the clear solution precipitated in methanol, repeatedly washed with fresh methanol and dried under vacuum. The polymer is soluble in aqueous hydrogen chloride- and sodium hydroxide solutions.

EXAMPLE 9

One gram of samples A and B of Orlon 42 staple fibers (registered trademark by Du Pont de Nemours & Co. for a copolymer containing acrylonitrile) are dissolved in 10 cm.³ of diethylformamide. To these samples are added different amounts of hydroxylamine hydrochloride and anhydrous sodium carbonate according to the following table. Both reaction mixtures are heated for three hours at 75° C., filtered, precipitated in methanol and dried.

Table III.—Properties of reaction product of Orlon 42 staple fibers with different amounts of hydroxylamine

| Expt. | NH₂OH.HCl, g. | Na₂CO₃, g. | Solubility in— | | |
|---|---|---|---|---|---|
| | | | DMF | HCl, N/10 | NaOH, N/10 |
| A | 1.3 | 1 | — | + | + |
| B | 0.65 | 0.5 | S | S | S |

Note.—DMF equals dimethylformamide; + equals soluble; − equals insoluble; S equals swells.

EXAMPLE 10

10 grams of a copolymer BMC 11–01B1 of the Bakelite Corporation (consisting of nearly 47 mol percent acrylonitrile and 53 mol percent styrene) are dissolved in 250 cm.³ of dimethylformamide. To 25 cm.³ of samples A and B of this solution are added different amounts of hydroxylamine hydrochloride and of anhydrous sodium carbonate according to the following table. The two samples are heated for two hours at 75° C. Thereafter they are suction-filtered, precipitated, washed in methanol and finally dried.

TABLE IV

| Expt. | NH₂OH.HCl, g. | Na₂CO₃, g. | Solubility in— | | |
|---|---|---|---|---|---|
| | | | DMF | Acetone | HCl, N/10 |
| A | 0.250 | 0.190 | + | S | — |
| B | 0.500 | 0.380 | + | S | — |

Note.—DMF equals dimethylformamide; + equals soluble; − equals insoluble.

EXAMPLE 11

A. *Preparation of Graft Polymer of Polyvinylpyrrolidone and Acrylonitrile*

The graft polymer is prepared according to the method described in Example 17 of British specification 715,194.

B. *Preparation of Amidoxime*

10 grams of the above graft polymer consisting of 45 grams of polyvinylpyrrolidone and 160 cm.³ of acrylonitrile are dissolved in 100 cm.³ of diethylformamide, and 10.7 grams of hydroxylamine hydrochloride and eight grams of anhydrous sodium carbonate are added. The mixture is heated for two hours at 80° C. After this time, the reaction mixture is suction-filtered, precipitated in methanol, washed with methanol and dried under vacuum. It is soluble in 0.1 normal aqueous hydrogen chloride, in 0.1 normal aqueous sodium hydroxide and in dimethylformamide.

EXAMPLE 12

A. *Preparation of Polyvinylcyanoethylether*

According to a method described in a communication by A. De Pauw at the International Congress of Industrial Chemistry, Brussels, September 1954, 22 grams Mowiol N 70/98 (registered trademark for polyvinyl alcohol of high molecular weight sold by Farbwerke Hoechst) are dispersed in 100 cm.³ acrylonitrile containing 0.5 gram dinitrobenzene as a polymerization inhibitor. After heating the mixture up to 75° C., one cm.³ of 0.1 normal sodium hydroxide is added. The polyvinylalcohol is fully dissolved after eight hours. The reaction mixture is precipitated in water and further purified by redissolution in acetone and precipitation in diethyl ether.

B. *Preparation of Amidoxime*

One gram of the above polyvinylcyanoethyl ether is dissolved in 20 cm.³ of dimethylformamide, and 2.1 grams of hydroxylamine hydrochloride and 1.5 grams of anhydrous sodium carbonate are added. After about three hours heating at 75° C., the reaction mixture is suction-filtered and the filtrate precipitated in methanol. The dried product swells in sodium hydroxide and in hydrogen chloride solution.

EXAMPLE 13

A. *Preparation of Cyanoethylated Polyethylene Glycol*

50 grams of polyethyleneglycol "600" (a polyethyleneoxide of low molecular weight made by Carbide and Carbon Chemicals Corporation) are mixed with 3.75 cm.³ of a 40% sodium hydroxide solution. To this solution, cooled to 0° C., 90 cm.³ of acrylonitrile containing 0.300 gram of dinitrobenzene as polymerization inhibitor are added dropwise. After three hours, the crude reaction mixture is poured into methanol. Formed polyacrylonitrile precipitates while the cyanoethylated polyglycol remains in dissolution. The filtered solution is neutralized with hydrogen chloride, concentrated by evaporation, filtered and finally precipitated in ether, wherefrom it is separated as an oil.

B. *Preparation of Amidoxime*

The oil obtained in A above is dissolved in 200 cm.³ of dimethylformamide and 13.8 grams of hydroxylamine hydrochloride and 8.7 grams of anhydrous sodium carbonate are sucecssively added thereto. After three hours reaction at 75° C., the mixture is suction-filtered and precipitated in ether. The oily layer is separated, washed with water, redissolved in methanol and precipitated in petroleum ether. This oil is soluble in 0.1 normal hydrogen chloride and 0.1 normal sodium hydroxide but insoluble in water.

EXAMPLE 14

A. *Preparation of Cyanoethylated Cellulose*

Viscose fibers are cyanoethylated according to the procedure described in Example 3 of United States specification No. 2,375,847. At the end of the reaction the homogeneous solution is precipitated in methanol, centrifuged, dried, dissolved in acetone, reprecipitated in methanol, centrifuged and dried again.

B. *Preparation of Amidoxime*

100 grams of this cyanoethylated cellulose are dissolved in 2000 cm.³ of dimethylformamide, 210 grams of hydroxylamine hydrochloride and 150 grams of anhydrous sodium carbonate are added. The mixture is heated at 75° C. while stirring for four hours. After this time, the sodium chloride formed is suction-filtered and the solution precipitated in methanol, centrifuged and dried. The freshly prepared product is soluble in 0.1 normal hydrogen chloride, but after standing a few days, it becomes insoluble.

EXAMPLE 15

A. *Cyanoethylation of Polyacrylamidoxime*

The polyacrylamidoxime prepared in Example 1C may be cyanoethylated by treating 10 grams of this polymer in 100 cm.³ of water with 1000 cm.³ of acrylonitrile in the presence of eight cm.³ of Triton B (a 40% aqueous solution of benzyl trimethylammonium hydroxide sold by Rohm & Haas, Philadelphia) and keeping it gently boiling for three hours. The solution obtained is precipitated in methanol and after several washings centrifuged and dried. This product is soluble in dimethylformamide, in 0.1 normal sodium hydroxide and in hydrogen chloride.

B. *Preparation of Amidoxime*

In the above cyanoethylated product, the nitrile groups may again be transformed into amidoxime groups by the following procedure. 10 grams of cyanoethylated product and 21 grams of hydroxylamine hydrochloride are dissolved in 200 cm.³ of dimethylformamide. To this solution are added 15 grams of anhydrous sodium carbonate and the whole is heated for two hours at 75° C. The sodium chloride which is formed is suction-filtered and the solution precipitated in methanol, washed and dried. This product shows again the characteristics of amidoximes, that is, being soluble in 0.1 normal sodium hydroxide and 0.1 normal hydrogen chloride.

EXAMPLE 16

*Hydrolysis of a Polymeric Amidoxime*

One gram of the reaction product from Example 4f is dissolved in 100 cm.³ of one normal sodium hydroxide and boiled for 60 hours. After neutralizing, the formed precipitate is suction-filtered, washed and dried. The product is insoluble in 0.1 normal aqueous hydrogen chloride and soluble in 0.1 normal sodium hydroxide.

EXAMPLE 17

One gram of the product from experiment 1C is dissolved in 80 cm.³ 0.1 normal hydrogen chloride. To this solution are added 200 cm.³ of a solution containing 0.800 gram "Croceine Brillante" (C. I. 252), a sodium salt of benzene-azo-benzene-azo-beta-naphthol-6,8-disulphonic acid, 0.500 gram sodium sulphate and 2 cm.³ one normal sulphuric acid. The deeply colored polymer precipitates as a fine powder which conglomerates on gently heating for 10 minutes; leaving the solution completely colorless. The excess of dye is washed out and the dried polymer pulverized to a fine powder which may be used as an organic pigment.

In the above examples, to obtain the best results, it is preferred that the non-aqueous solvent medium be as completely free from water as possible. However, it is difficult to completely remove the final traces of water from certain solvents. Such minor amounts of water are tolerable. Therefore, for purposes of this specification and claims, "non-aqueous solvent" embraces limited amounts of water, not exceeding about seven percent.

It should be appreciated that the instant invention is not to be construed as being limited by the illustrative examples. It is possible to produce still other embodiments without departing from the inventive concept herein disclosed. Such embodiments are within the ability of one skilled in the art.

What is claimed is:

1. A process for producing high polymers characterized by a plurality of amidoxime groups which comprises heating in a non-aqueous solvent medium a high polymer selected from the group consisting of a polymer of acrylonitrile, a polymer of methacrylonitrile, a polymer of vinylidene cyanide, cyanoethylated polyvinyl alcohol, cyanoethylated cellulose, cyanoethylated polyvinyl amine, cyanoethylated polyacrylamide and cyanoethylated polymethacrylamide with free hydroxylamine, sufficient to transform a substantial amount of the CN groups, with the formation of amidoxime groups.

2. The process according to claim 1 wherein the non-aqueous solvent is an alcohol.

3. The process according to claim 1 wherein the non-aqueous solvent is dimethyl formamide.

4. The process according to claim 1 wherein the free hydroxylamine is formed in situ from its salt.

5. A polymer characterized by a plurality of amidoxime groups prepared according to the process of claim 1.

References Cited in the file of this patent

UNITED STATES PATENTS

| | | |
|---|---|---|
| 1,984,417 | Mark et al. | Dec. 18, 1934 |
| 2,495,286 | Brubaker | Jan. 24, 1950 |
| 2,671,066 | Justice | Mar. 2, 1954 |
| 2,727,835 | Barrett | Dec. 20, 1955 |
| 2,739,136 | Kharasch et al. | Mar. 20, 1956 |
| 2,792,276 | Kaupin et al. | May 14, 1957 |